United States Patent Office 3,480,981
Patented Dec. 2, 1969

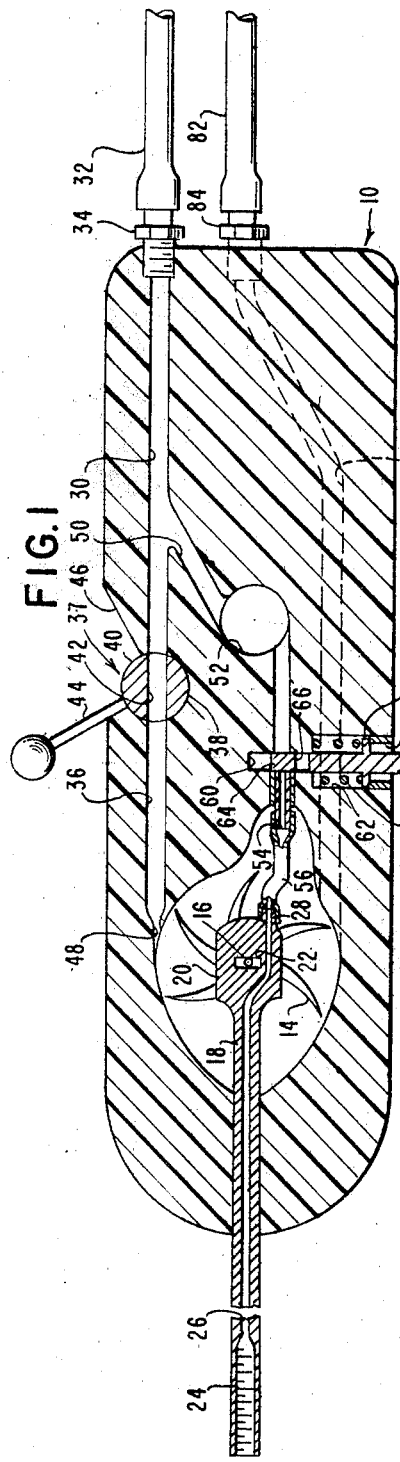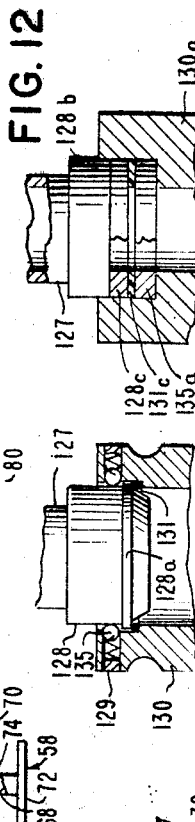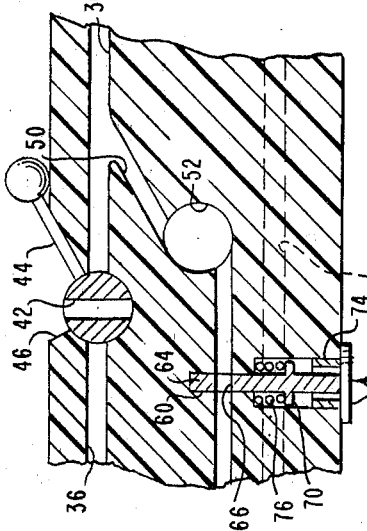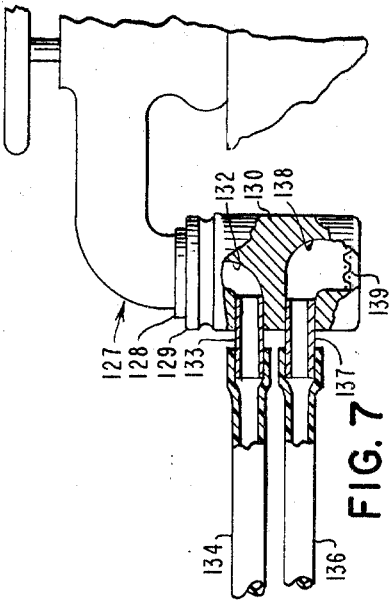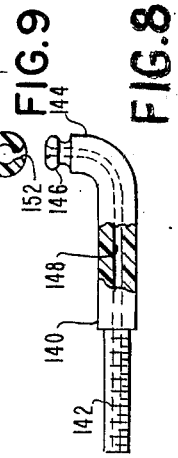

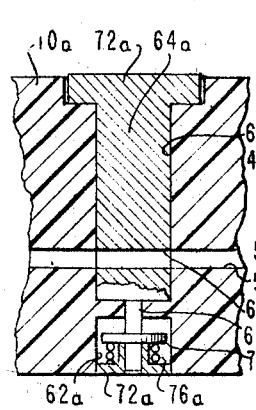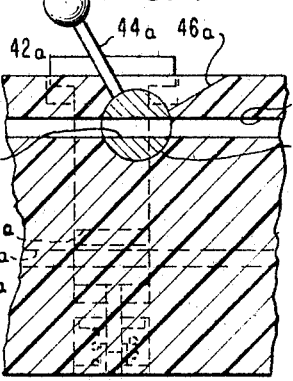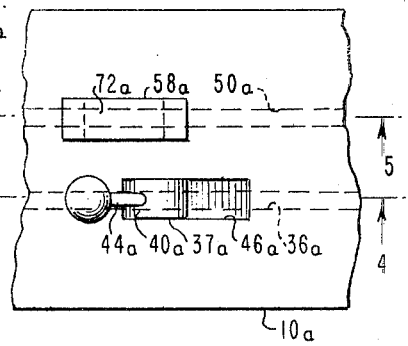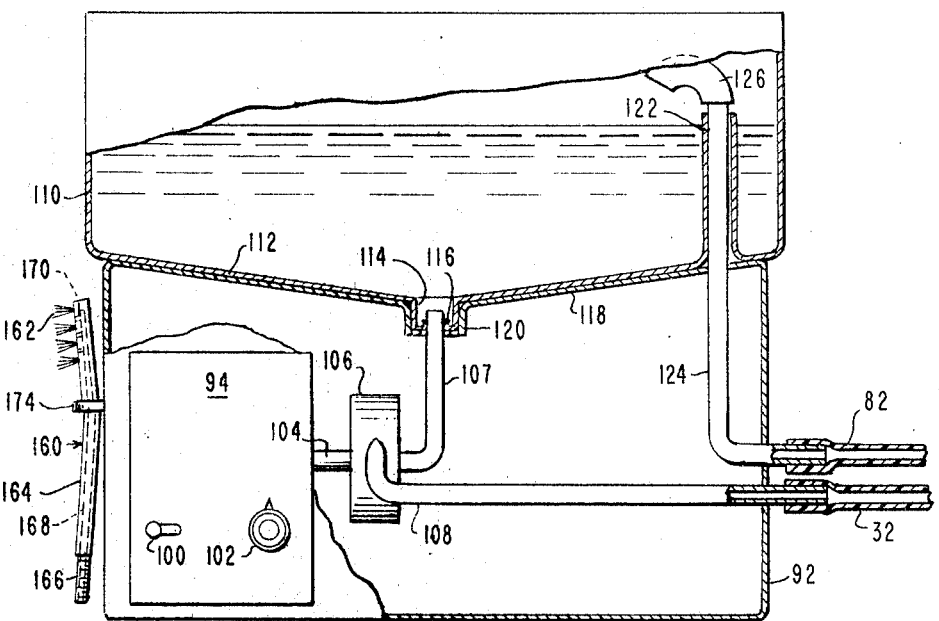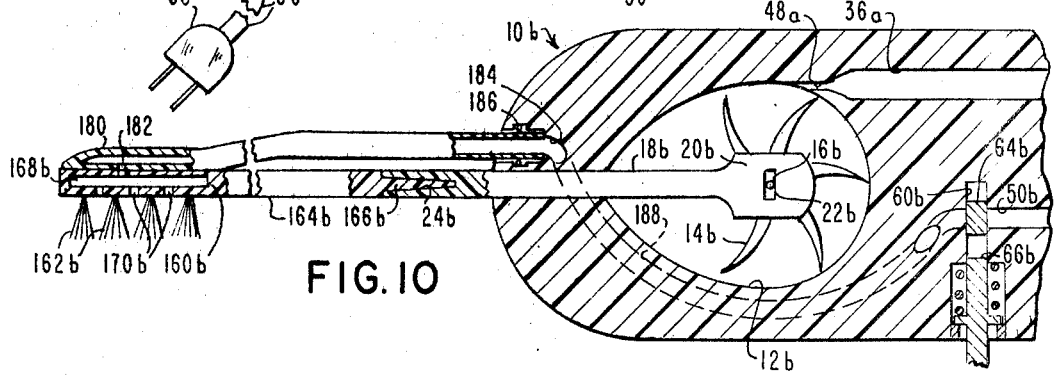

3,480,981
ORAL APPLIANCE FOR CLEANING, STIMULAT-
ING AND/OR IRRIGATING THE MOUTH
Isaac I. Murov, Shrub Oak, N.Y. (Mohegan Lake, N.Y. 10547); Morton J. Schloff, Scarsdale, N.Y. (210 E. 68th St., New York, N.Y. 10021); and Francis V. Panno, Larchmont, N.Y. (444 E. Boston Post Road, Mamaroneck, N.Y. 10543)
Filed Dec. 20, 1967, Ser. No. 692,220
Int. Cl. A61h *13/00*
U.S. Cl. 15—22                                    14 Claims

ABSTRACT OF THE DISCLOSURE

An oral appliance for cleaning, stimulating and/or irrigating the mouth, e.g., a toothbrush, a novel interdental stimulator and irrigator, and the like, which have a valve controlled passage for flow of water therefrom. The source of the water may be a faucet with a novel connector or a novel combination of a reservoir with means to force water in the reservoir, preferably at variable pressure, through the appliance. Preferably, the appliance is mounted on a handle provided with means, e.g., a water-powered motor, for imparting movement to the appliance relative to the handle. The movement imparting means and the valve to control the flow of water from the source through the appliance are independently controlled, e.g., by digital controls or operating members arranged either for activation by a thumb and finger or by a thumb or finger. The interdental stimulator and irrigator comprises an irrigating head having a threaded end and an angular end with a bead and a flexible interdental stimulator having a removable pressure connection to the angular end. The irrigating head and stimulator have a water passage through them.

---

The present invention relates to an oral appliance for cleaning, stimulating and/or irrigating the mouth, e.g., a toothbrush, a novel interdental stimulator and irrigator, and the like, which comprises a handle part which houses a motor operatively connected to an appliance holder. The appliance holder is power driven by the motor to move relative to the handle. The appliance and handle have a water passage through them so that water can be supplied through the appliance to the area which is being cleaned and/or stimulated. Preferably, the motor is water powered and the handle is provided with separate valves and associated digital controls or operating members for controlling the water to the motor and the water to the appliance.

The invention also relates to an oral appliance having, in combination, a water-powered motor and means to supply water for the motor which may be a self-contained reservoir and pump unit or a special faucet connector.

The invention also relates to an oral appliance comprising, in combination, an irrigation head, a flexible interdental stimulator and irrigation tip having a removable pressure connection to the irrigation head, both of them being supplied with a water passage so that interdental tissue can be stimulated and irrigated simultaneously or separately.

The oral appliance of the invention, in its various facets stated above, will be specifically described in conjunction with the appended drawings in which:

FIG. 1 is a longitudinal sectional view of the body of the appliance;

FIG. 2 is a fragmentary longitudinal sectional view of the appliance body with control valves in a different position;

FIG. 3 is a fragmentary side view of a second embodiment of the appliance body according to the invention;

FIG. 4 is a fragmentary sectional view on line 4—4 of FIG. 3;

FIG. 5 is a fragmentary sectional view on the line 5—5 of FIG. 3;

FIG. 6 is a side view, with parts in section, of a power-driven source of water under pressure for the appliance;

FIG. 7 is a side view, with parts in section, of a removable connector to a source of water under pressure for the appliance;

FIG. 8 is a side view of the irrigation head used in conjunction with the interdental stimulator or irrigation tip;

FIG. 9 is a side view of the interdental stimulator and irrigation tip used in combination with the irrigator head of FIG. 8;

FIG. 10 is a fragmentary longitudinal sectional view of a further embodiment of the appliance body and appliance connection thereto;

FIG. 11 is a fragmentary sectional view of a quick coupler of known construction that may be used in the invention; and FIG. 12 is a fragmentary sectional view of a novel quick coupler.

Referring first to FIG. 1, a body or handle member 10 is provided which has a rotor chamber 12 in which a rotor 14 is suitably mounted in journals or bearings so as to be rotatable about its axis. At one side of the rotor, and as seen in FIG. 1, it is the upper side, an eccentric pin or crank 16 is mounted which makes connection with a pitman 18 having a head 20 provided with a suitable means for connecting the pitman to the pin or crank. In the embodiment shown in FIG. 1, the pitman is axially reciprocable, i.e., along the axis of the pitman, with respect to the body 10 and a form of connection may be a simple transverse slot 22 having a length at least equal to the diameter of rotation of the eccentric pin 16. The invention also contemplates movement of the appliance relative to the body or handle other than reciprocal along the axis, including transverse motion, orbital motion, rocking motion and combinations of these as more particularly described and illustrated in applicants' prior Patent No. 3,214,775.

The end of the pitman remote from the head 20 extends outside the body 10 and is provided with any suitable means, e.g., a female thread 24 or friction connection such as that described hereinafter with reference to FIG. 10, to receive and hold various appliances. A water passageway 26 is provided which, as shown in FIG. 1, may extend longitudinally through the pitman 18 and terminate at the head end thereof in a nipple 28.

An inlet passageway 30 for water is provided in the body 10 to connect with an inlet tube or liquid supply line 32 by means of a suitable connector 34. The inlet passage 30 divides into two branches. One of the branches 36 is a passage for the driving liquid and flow of the water through this passage is controlled by a valve 37, sometimes referred to herein as a first valve, which comprises a cylindrical recess 38, a cylinder 40 snugly fitted within the recess in water-tight relation, a transverse passage 42 through the cylinder to connect the opposite sides of the passage for driving liquid, and a handle 44, sometimes referred to herein as a first digital control, for rotating the cylinder 40 on its axis to align and disalign the passage 42 with the passage 36. The handle 44 operates in a notch 46 formed in the body 10 which permits sufficient rotation of the cylinder 40, e.g., approximately 90°.

The passage 36 for the driving liquid terminates in a nozzle or restriction 48 in the rotor chamber 12 so that the water enters as a jet stream tangentially into the chamber so as to impinge upon and drive the blades of the rotor.

The second branch of inlet passage 30 is an irrigating passage 50 which preferably connects with a detergent chamber 52 which may hold a supply of water soluble or suspendable cleaning material for the teeth. Beyond the detergent chamber 52, the irrigating passage extends into a recess in the rotor chamber where it terminates in a nipple 54. A flexible connecting tube 56 connects passage 26 with passage 50 when it is firmly but removably connected to the nipples 28 and 54.

A valve 58, sometimes referred to herein as a second valve, is provided in the irrigating passage 50 to control the flow of water through it to the appliance fastened to the pitman 18. Any suitable valve which permits opening of the valve passage to a controlled and selected degree from completely closed to completely opened may be used. Valve 58, as illustrated, is a gate valve operating in a rectangular recess 60 at the bottom of a cylindrical recess 62 extending from the surface of the handle inwardly. A gate 64 having an aperture 66 extending transversely therethrough has watertight fit in recess 60. Secured to the gate is a shank 68 having an intermediate collar 70 of about the same diameter as the cylindrical recess 62 and a thumb piece 72, sometimes referred to herein as a second digital control at the exposed end. The shank and gate are held within their respective recesses by a retainer ring 74 which has a press or screw fit in the recess 62. A helical compression spring 76 is arranged around the shank 68 so as to press against the collar 70 and the bottom of the cylindrical recess 62 and yieldingly urge the valve to the closed position shown in FIG. 1.

In the embodiment of the invention just described, it will be noted that the first digital control or valve handle 44 of the valve 37 and the second digital control or thumb piece 72 of the valve 58 are on opposite sides of the body 10 so that they can be moved independently, e.g., one of them can be moved with the finger and the other with the thumb. Each of the valves, moreover, is of a construction that permits fine adjustment of the effective opening through the valve from completely shut to completely open and thereby independently control the speed of the motor through the entire range from zero to full speed and the volume of water discharged from the oral appliance into the mouth through the entire range from zero to maximum rate of flow.

The rotor chamber 12 is provided with an outlet passage 80 which takes off tangentially to the cylindrical surface on the opposite side from the nozzle 48. It passes at one side or the other of the recess 60 or 62 and makes connection with the outlet tube or liquid return line 82 by means of a suitable connector 84 which may be similar to connector 34 in structure.

FIG. 2 is a fragmentary sectional view of the same embodiment of the invention shown in FIG. 1 with the two valves in opposite positions from those shown in FIG. 1. Thus, valve 37, which in FIG. 1 is in fully open position, is in fully closed position in FIG. 2, whereas valve 58, which is in fully closed position in FIG. 1, is in completely open position in FIG. 2. It will be understood, of course, that these valves may be moved gradually from the position of FIG. 1 to the position of FIG. 2 so that the person using the appliance can readily adjust the speed of the motor to give any desired frequency to the relative movements of the oral appliance to the body and that the volume of water flowing into the mouth through the appliance can also be fully controlled and adjusted. Moreover, the movement of the appliance by means of valve 37 is entirely independent of the flow of water through the appliance so that one can use a toothbrush, an interdental stimulator, or the like, with or without the flow of water from it and can also irrigate the mouth with or without the movement of the appliance relative to the handle or body 10.

FIGS. 3, 4 and 5 illustrate another embodiment of the invention in which the two valves and associated digital controls or operating members for separately controlling the relative movement of the appliance and the flow of liquid therefrom in the mouth are arranged adjacent to each other on the same side as the handle or body. In these figures, the reference numerals are the same as those in the embodiment of FIGS. 1 and 2 except that a postscript *a* has been added to them. The structure of valve 37a is substantially the same as the structure of valve 37 and need not be further described. Valve 58a, however, in this embodiment is somewhat different.

Valve 58a comprises a rectangular recess 60a which extends from a position in the body on one side of the irrigating passage 50a to the outside of the body on the other side of said passage and preferably is enlarged adjacent to the surface to provide a somewhat larger recess for the thumb piece 72a. At the end of recess 60a, an opening is provided for the shank 68a which extends into a cylindrical recess 62a that opens the surface of the body 10a on the opposite side. A transverse passage 66a is provided in the gate 64a of the valve which may be aligned with the passage 50a as shown in FIG. 5 or completely disaligned as shown in FIG. 4. A retainer ring 72a is provided at the mouth of the recess 62a with a press or threaded engagement with the body 10a and a spring 76a surrounds the shank 68a and engages at its respective ends the retainer ring 72a and the collar 70a so as to resiliently bias the valve 58a to the closed position shown in FIG. 4.

In the operation of the embodiment of the invention shown in FIGS. 3, 4 and 5, the operator will place the handle 44a with a digit, i.e., either the thumb or a finger, in a desired position to control the rate of relative movement of the appliance with respect to the handle or body 10a and then with the same digit the valve 58a is moved inwardly to permit the flow of the desired volume of water from the appliance into the mouth.

In order to operate the oral appliance as described, it is necessary to connect the inlet tube 32 with a source of liquid under pressure and the outlet tube 82 to receptacle or drain. The present invention contemplates the two different forms of means for supplying the liquid, usually water, under pressure and for receiving the used liquid which are shown, respectively, in FIGS. 6 and 7 as well as a direct connection of inlet tube 32 to a water supply line and of outlet line 82 to a drain line.

Referring now to FIG. 6, a power-driven souce of water under pressure 90 is illustrated which comprises a frame 92 in which an electric motor 94 is mounted. The electric motor is provided with a cord 96 of suitable length having a male plug 98 adapted to be inserted in a conventional electric outlet receptacle. An off-on switch 100 is provided to control the operation of the electric motor and it is preferred also to provide a rheostat 102 for speed control of the motor which in turn controls pressure and volume of water delivered. The shaft 104 of the motor is operably connected to a pump 106 which may have any suitable construction but which is illustrated in the drawing as a centrifugal pump having a water inlet pipe 107 and a water outlet 108, the exit end of which extends through the frame 98 to provide a nipple to which the liquid supply line 32 can be firmly but removably secured in water-tight relation. A reservoir 110 for holding a supply of water and which has a funnel-shaped bottom 112, an outlet 114, and a valve 116 for making connection with the inlet pipe 107 removably rests on a support 118 which forms part of the frame 92. A recess 120 in support 118 receives the outlet of reservoir 110 and also serves to support and center the end of inlet pipe 107. The valve 116 is of the type which permits the end of pipe 107 to pass through it in watertight relation and then quickly to close when the reservoir 110 is lifted off its support 118 for refilling or renewing the liquid in the reservoir. An inlet casing 122, which is open at both ends, is provided in the funnel-shaped bottom 112 of the reservoir 110 and it extends upwardly far enough to permit a desired depth of water in the reservoir 110. Passing through the casing 122 is a return line 124 which may be made in L-shape with the one end extending into the reservoir where a return bend 126 is threaded or otherwise removably secured to the end thereof so that water flowing through the pipe 124 is directed downwardly into the reservoir some distance away from the casing 122. The other end of pipe 124 extends outwardly through the casing 92, a sufficient distance to form a nipple to which the liquid return line 82 can be firmly but removably secured in water-tight relation.

The frame 92 also provides a convenient support for holding the removable oral appliances used with the device as will be described hereinafter.

Referring now to FIG. 7, a water faucet 127 is illustrated which is provided with an aerator 128 at the end of the spigot. Most modern faucets are provided with such an aerator which has a threaded connection to the end of the spigot. Usually, the spigot has an internal female thread to receive a male thread on a projection of smaller diameter on the aerator, but in some cases, the spigot has an external male thread to screw into an internally threaded recess in the upper end of the aerator. In some cases, faucets are not provided with threaded spigots and an aerator used with such a spigot has expandable friction connection therewith. In the present invention, a quick coupler 129 attached to a connector 130 is used to make a removable connection with an aerator 128 on the end of the spigot of a water faucet 127. If the aerator on a particular faucet is not constructed to make the quick coupling, it would be replaced by one which is so constructed and for this purpose, the connector may be provided with a suitable aerator and an adaptor to connect it to the spigot any type of faucet. The connector 130 is provided with means (not shown) to inactivate the aerator by raising the screen and cone conventionally used so that non-aerated water is provided from the spigot to one end of a passage 132 which terminates at the other end in a nipple 133 for making connection to a water supply line 134. It will be understood that this water supply line 134 will be connected to the connector 34 of the appliance in the same way that supply line 32 is shown connected to it in FIG. 1. A return line 136 is also provided which would make connection with the connector 84 in the same manner that return line 82 is shown in FIG. 1. A nipple 137 is provided on the connector to make the firm but removable water-tight connection of 136 with the connector and it is in communication with the water outlet passage 138 which exits from the connector and the end opposite to the inlet 132 and the mouth of the outlet passage 138 may be provided with a screen 139 to make the flow of the water from the connector smoother.

FIG. 11 shows a quick coupler of conventional type which may be used with one widely used type of aerator 128 which has a raised ring 128a surrounding it. The quick coupler 129 includes a plurality of spring pressed balls 135 which yield to permit the coupler to be snapped past the ring 128a and then engage the upper edge thereof so as to give a resilient upward bias to the coupler and provide water-tight coupling, particularly if gasket material 131 is used.

FIG. 12 shows a novel quick coupler which comprises an aerator 128b having secured to the outer end thereof a ring 128c of a strong permanent magnet. The quick coupler 130a is provided with a similar ring 135a of permanent magnet of opposite polarity so that magnets 128c and 135a attract each other to give a strong resilient upward bias to the coupler and provide a water-tight coupling, particularly if a thin gasket 131c is used. If desired, one of the rings 128c or 135a may be made of soft iron instead of being a permanent magnet.

Both embodiments of the means to supply water under pressure to the oral appliance shown in FIGS. 6 and 7 provide a supply of water to the appliance with some degree of control as to rate of flow and pressure. In the embodiment of FIG. 6, this control is provided by rheostat 102 and in the embodiment of FIG. 7 by the handle of the faucet which can be turned a desired degree to provide water under proper pressure and flow rate. Both embodiments provide adjacent nipples for connecting the source to the water supply and return lines 32 and 82. This is an advantage because the supply and return lines 32 and 82 can be secured together, or even be made integral, so that there is no difficulty with spillage of the water from the return line as can happen if the return line is not secured at its discharge end to something fixed.

Referring now to FIGS. 8 and 9, an appliance is shown which is of great utility in oral hygiene. It comprises an irrigating head 140 having a removable connection, e.g., male thread 142, at one end which is adapated to make water-tight threaded connection with pitman 18, e.g., by means of the female thread 24. The other end 144 is angularly related to the axis of the threaded end 142 and it is provided with a bead 146 for a purpose soon to be described. A water passage 148 is provided through the irrigating head.

An interdental stimulator and irrigating tip 150 is provided which may be made of any suitable flexible material, e.g., natural or synthetic rubber, plastic, and the like which is suitably vulcanized or compounded to provide a flexible but somewhat firm tip which can be placed in interdental spaces to irrigate the proximal surfaces of adjacent teeth and also, when moved back and forth, stimulate the gum tissue adjacent thereto. One end of the tip is thickened and provided with a lip 152 to provide a snap end to engage the bead 146 in firm but removable water-tight relation. Any other suitable pressure connection between the tip and the angular end 144 may also be used according to the invention. The tip is preferably tapered from the snap or pressure end to the discharge end which is made small enough and thin enough to enter the interdental spaces for massaging and irrigating the proximal surfaces of adjacent teeth. A water passage 154 is provided through the entire length of thhe tip. When the irrigating head 140 is attached to the pitman 18, the oral appliance can be used either merely to stimulate the gum tissue by operating the motor in the handle without operating the water supply valve 58 or it can be used merely to irrigate by closing the valve 37 and operating the valve 58. On the other hand, it can be used simultaneously to irrigate and stimulate by opening both valves 37 and 58 and the speed of the relative movement of the tip with respect to the handle can be adjusted as desired by moving handle 44 and at the same time the rate of flow of the water can be controlled by the relative position of valve 58 with respect to the handle 10.

FIG. 6 shows a toothbrush which can be used with the appliance which comprises bristles 162 secured to a handle 164 having a threaded end 166 to make a removable but water-tight connection to pitman 18 by means of the female threads 24. A water passage 168 passes from the end 166 through the handle to the vicinity of the brushes where a number of outlets 170 are provided to discharge water outwardly in the direction of and through the bristles 162. As mentioned above, the frame 92 forms a convenient support for these various appliances that are used with the device and as shown, a rack 174 is secured to frame 92 for holding any number of toothbrushes, irrigating tips, and the like.

FIG. 10 shows a somewhat different embodiment of the invention with respect to the means to supply water to the appliance and the means for removably connecting the appliance to the pitman. In this embodiment, the water supply line does not go through the pitman and the handle of the toothbrush, as in the embodiment previously described, but there is in both embodiments a water passage through the handle member 10 and a valve to control the flow of water from the source to the appliance. Thus, handle 10b has a water passage 50b similar to 50 in handle 10, a recess 60b, gate 64b and aperture 66b similar to the correspondingly designated parts of FIG. 1. From gate 64b, a passage 188 is provided around rotor chamber 12b and at one side of pitman 18b which opens to the outside near the pitman is a straight passage 184 considerably longer than the axial movement of the pitman 18b produced by the rotor 14b, eccentric 16b and slot 22b in the head 20b when water flows through passage 36a and nozzle 48a under control of a valve (not shown) similar to 37. An O-ring 186 is provided to make water-tight connection between handle member 10b and a tube 180 that is secured at the other end to a toothbrush 160b near the bristles 162b but on the other side so that a passage 182 can connect tube 180 with a chamber 168b in the toothbrush which in turn has a plurality of outlets 170b analogous to outlets 170 in the brush of FIG. 6.

The removable connection between the appliance of FIG. 10 and the pitman 18b includes a tapered recess 24b in the end of one of them, e.g., the pitman, and a corresponding tapered projection 166b on the other, e.g., the handle. When the taper is quite gradual, a strong frictional connection is made that can be broken by a slight pull and twist of one relative to the other.

At the time the parts are being assembled, the free end of the tube 180 is inserted in the opening 184 to form the water-tight connection previously referred to.

It will be seen that the embodiment shown in FIG. 10 will operate in the same way as the embodiment of FIG. 1. The removable connection of the irrigating head of FIG. 8 may be a tapered connection, as previously mentioned, in which case the water passage may be a separate tube as in FIG. 10 which could enter the angular end 144 below the pressure connection.

What is claimed is:

1. An oral appliance comprising:
    (a) a handle member,
    (b) a pitman mounted in said member for movement relative to said handle member,
    (c) water-powered motor means in said handle operatively connected to said pitman to move it relative to said handle member,
    (d) means to connect said water-powered motor means to a supply of water under superatmospheric pressure,
    (e) means to connect said water-powered motor means to a water discharge line,
    (f) a first valve in said handle to control the flow of water from said supply to said water-powered motor means,
    (g) an oral appliance secured to said pitman,
    (h) a water passage independent of said water-powered motor means through said handle member and oral appliance adapted to be connected with said supply of water,
    (i) a second valve in said handle independent of said first valve to control the flow of water from said supply through said independent passage to said appliance,
    (j) a first digital control to operate said first valve, and
    (k) a second digital control to operate said second valve.

2. An oral appliance according to claim 1 in which the means to connect said water-powered motor means to a supply of water under superatmospheric pressure includes a portable unit comprising a reservoir for water at atmospheric pressure and a motor-driven pump having inlet and outlet lines, said inlet line connected to said reservoir to supply water to said pump to be raised to superatmospheric pressure and a tube connecting said outlet line to said water-powered motor means to supply said water under superatmospheric pressure thereto.

3. An oral appliance according to claim 1 in which the means to connect said water-powered motor means to a supply of water under superatmospheric pressure includes a water faucet connector, a water inlet in said water faucet connector, a tube connecting said water inlet to said water-powered motor means, a water outlet from said water faucet connector, and a tube connecting said water discharge line to said water outlet.

4. An oral appliance comprising:
    (a) a handle member,
    (b) a pitman having an oral appliance secured thereto mounted in said member for movement relative thereto,
    (c) a water-powered motor in said member operatively connected to said pitman to effect said movement,
    (d) portable means to supply water to and receive water from said motor comprising:
        (1) a water reservoir,
        (2) a pump,
        (3) an electric motor drivingly connected to said pump,
        (4) a water inlet line connecting said reservoir to said pump,
        (5) a water outlet line connecting said pump to said water-powered motor,
        (6) a water return line from said water-powered motor to said reservoir, and
    (e) a valve to control flow of water from said supply means to said water-powered motor through said water outlet line.

5. An oral appliance as set forth in claim 4 in which said water reservoir is removably connected to said water inlet line and said water return line.

6. An oral appliance set forth in claim 4 in which said electric motor is a variable speed motor and means are provided to vary the speed thereof.

7. An oral appliance comprising:
    (a) a handle member,
    (b) a pitman having an oral appliance secured thereto mounted in said member for movement relative thereto,
    (c) a variable speed water-powered motor in said member operatively connected to said pitman for effecting said movement,
    (d) portable motor-driven means to supply water under pressure to said water-powered motor, and
    (e) means to control the speed of the motor-driven means to vary the pressure of the water from said water supply means.

8. An oral appliance comprising:
    (a) a handle member,
    (b) a pitman mounted in said member for movement relative thereto,
    (c) a variable speed motor in said member for effecting said movement,
    (d) means on said member to control fine adjustment of the speed of movement of said motor through the entire range from zero to full speed,
    (e) an appliance secured to said pitman having a water passage therein,
    (f) a water supply line connecting said water passage to a supply of water under superatmospheric pressure, and
    (e) means independent of said motor control means to control the supply of water to said appliance.

9. An oral appliance comprising:
    (a) a handle member,
    (b) a pitman mounted in said member for movement relative to said handle member,
    (c) variable speed means in said handle operatively connected to said pitman to move it relative to said handle member,
    (d) an appliance secured to said pitman including a rubber interdental stimulator and irrigation tip,
    (e) a water passage through said handle member and said tip,
    (f) a water supply line adpated to connect said water passage to a supply of water under superatmospheric pressure, (g) means on said member to control movement of said pitman through the entire range from zero to full speed, and (h) means on said member independent of said pitman movement control means to control flow of water to said tip through the entire range from zero to maximum rate of flow.

10. An oral appliance as set forth in claim 1 in which said digital operating members are on opposite sides of said handle for operation by a thumb and a finger respectively.

11. An oral appliance as set forth in claim 1 in which said digital operating members are on the same side of said handle for opeartion by a thumb or finger.

12. An oral appliance comprising:
(a) a handle,
(b) a pitman mounted in said handle for movement relative therteo,
(c) an appliance connected to said pitman,
(d) variable speed means in said handle operatively connected to said pitman for moving it relative to said handle,
(e) means including a water passage through said appliance for connecting it to a source of water,
(f) means on said handle for controlling fine adjustment in the speed of said pitman moving means through the entire range from zero to full speed, and
(g) means on said handle handle independent of the pitman controlling means for controlling the rate of flow of water to said appliance through the entire range from zero to maximum.

13. An oral appliance as set forth in claim 12 in which said appliance is a flexible interdental stimulator and irrigation tip.

14. An oral appliance as set forth in claim 12 in which said appliance is a toothbrush.

References Cited

UNITED STATES PATENTS

| | | | |
|---|---|---|---|
| 3,273,189 | 9/1966 | Levinson et al. | 15—22 |
| 1,327,757 | 1/1920 | Eggers | 401—28 |
| 2,733,713 | 2/1956 | Kabnick. | |
| 3,039,123 | 6/1962 | Brucker et al. | |
| 3,056,151 | 10/1962 | Vlacancich | 15—29 |
| 3,199,510 | 8/1965 | Sinai. | |
| 3,213,471 | 10/1965 | Freeman | 15—22 |
| 3,214,775 | 11/1965 | Murov et al. | 15—22 |
| 3,225,759 | 12/1965 | Drapen et al. | |

FOREIGN PATENTS

| | | |
|---|---|---|
| 612,538 | 11/1960 | Italy. |
| 730,840 | 3/1966 | Canada. |

EDWARD L. ROBERTS, Primary Examiner

U.S. Cl. X.R.

128—62

UNITED STATES PATENT OFFICE
CERTIFICATE OF CORRECTION

Patent No. 3,480,981                      December 2, 1969

Isaac I. Murov et al.

It is certified that error appears in the above identified patent and that said Letters Patent are hereby corrected as shown below:

In the heading to the printed specification, line 5, "Morton J. Schloff" should read -- Morton J. Schloss --.

Signed and sealed this 27th day of October 1970.

(SEAL)
Attest:

Edward M. Fletcher, Jr.                  WILLIAM E. SCHUYLER, JR.
Attesting Officer                          Commissioner of Patents